(12) United States Patent
Hodjat et al.

(10) Patent No.: US 8,555,504 B1
(45) Date of Patent: Oct. 15, 2013

(54) METHOD OF FORMING A SPROCKET

(75) Inventors: Yahya Hodjat, Oxford, MI (US); Marc Cadarette, Windsor (CA); Cathy Peake Wilson, Elizabethtown, KY (US)

(73) Assignee: Gates Corporation, Denver, CO (US)

( * ) Notice: Subject to any disclaimer, the term of this patent is extended or adjusted under 35 U.S.C. 154(b) by 0 days.

(21) Appl. No.: 13/465,248

(22) Filed: May 7, 2012

(51) Int. Cl.
*B21D 53/28* (2006.01)

(52) U.S. Cl.
USPC .............................. 29/893; 29/451; 29/893.3

(58) Field of Classification Search
USPC ............... 29/451, 457, 464, 467, 893, 893.1, 29/893.2, 893.3, 893.35; 74/73, 89.13, 98, 74/721
See application file for complete search history.

(56) References Cited

U.S. PATENT DOCUMENTS

| | | |
|---|---|---|
| 5,037,356 A | 8/1991 | Gladczak et al. |
| 5,074,406 A * | 12/1991 | Gundlach et al. ............. 198/834 |
| 6,086,495 A | 7/2000 | Stebnicki et al. |
| 6,142,900 A | 11/2000 | Takamori |
| 6,599,210 B1 | 7/2003 | Takamori et al. |
| 6,672,126 B2 | 1/2004 | Hodjat |
| 6,910,980 B2 | 6/2005 | Hamilton |
| 7,097,580 B2 | 8/2006 | Sakamoto |
| 7,232,392 B2 | 6/2007 | Hamilton |
| 7,252,066 B2 | 8/2007 | Hamilton |

* cited by examiner

*Primary Examiner* — Jermie Cozart
*Assistant Examiner* — Lee Holly
(74) *Attorney, Agent, or Firm* — J. A. Thurnau; P. N. Dunlap

(57) ABSTRACT

A method of forming a sprocket comprising forming a sprocket member having a tooth profile, forming grooves in the sprocket member base, installing a plurality of sprocket members in a mandrel thereby forming a build, applying an elastomer member between adjacent sprocket members, wrapping a tensile member about the sprocket members and elastomer members, curing the build, removing the build from the mandrel, and inverting the build and joining the build to a rigid core.

5 Claims, 9 Drawing Sheets

METHOD OF FORMING A SPROCKET

FIELD OF THE INVENTION

The invention relates to a method of forming a sprocket, more particularly, to a method of forming a sprocket by assembling components on a mandrel to make a build and then joining the build to a rigid core.

BACKGROUND OF THE INVENTION

Sprockets that are used in timing belt power transmission systems must have very tight tolerances to work properly. As diameters of sprockets increase, not only does it become more difficult to hold the tight tolerances (geometrical effect), but the expansion and contraction of the metallic material of the sprocket also adversely affects tolerances. In some applications such as large modern wind power generators, the diameter and the width of a power transmission sprocket has to be over 1.5 meters and the temperature fluctuations in the housing on the top of the wind tower could be in the range of over 100 degrees Celsius. Subsequently, using a belt drive system becomes very challenging if the sprockets tolerances are too variable.

Representative of the art is U.S. Pat. No. 5,074,406 which discloses a sprocket arrangement which provides increased contact surface area for driving conveyor belts is disclosed. The sprocket is particularly suitable for abrasive applications and/or use with modular plastic belts. The sprocket is formed by stacking and aligning a multiplicity of thin substantially disk shaped sprocket lamina together and then joining the stacked and aligned lamina by simply bolting or welding. Each of the sprocket lamina includes a central aperture for fitting onto a drive shaft. Teeth or other driving surfaces are also formed around the perimeter of each of the lamina. The lamina may be stacked in contact with each other, or for some applications may use spaces to separate selected ones of the stacked lamina so as to cooperate with the structure of the belt being driven.

What is needed is a method of forming a sprocket by assembling components on a mandrel to make a build and then joining the build to a rigid core. The present invention meets this need.

SUMMARY OF THE INVENTION

The primary aspect of the invention is a method of forming a sprocket by assembling components on a mandrel to make a build and then joining the build to a rigid core.

Other aspects of the invention will be pointed out or made obvious by the following description of the invention and the accompanying drawings.

The invention comprises a method of forming a sprocket comprising forming a sprocket member having a tooth profile, forming grooves in the sprocket member base, installing a plurality of sprocket members in a mandrel thereby forming a build, applying an elastomer member between adjacent sprocket members, wrapping a tensile member about the sprocket members and elastomer members, curing the build, removing the build from the mandrel, and inverting the build and joining the build to a rigid core.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
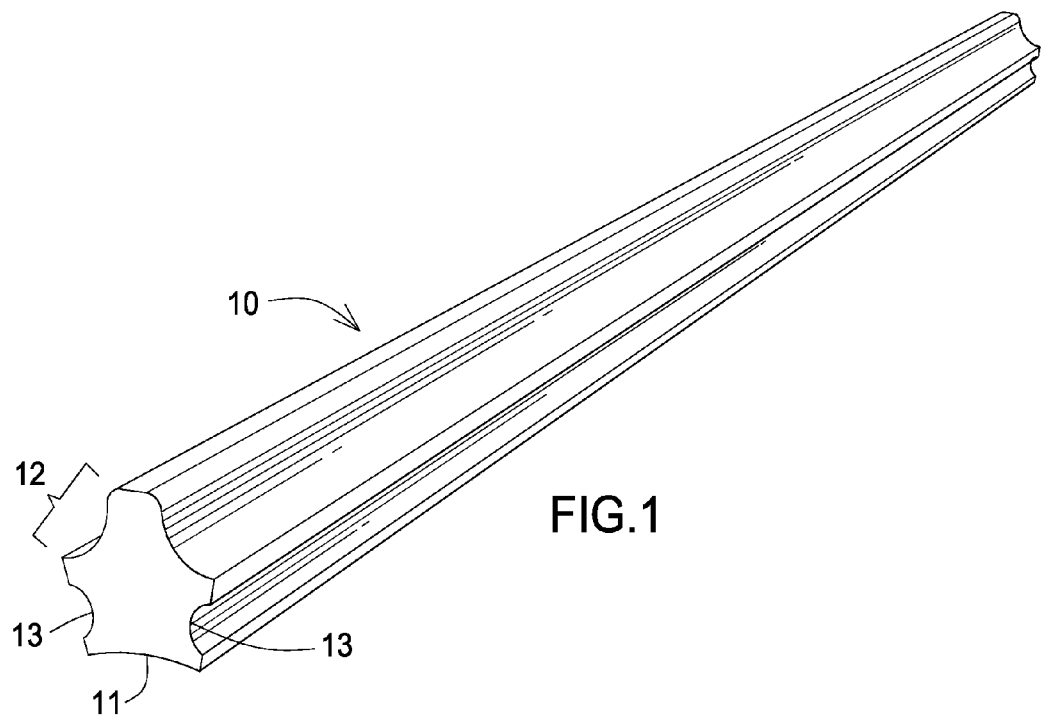
FIG. 1 is a perspective view of a sprocket tooth section.
Figure 2:
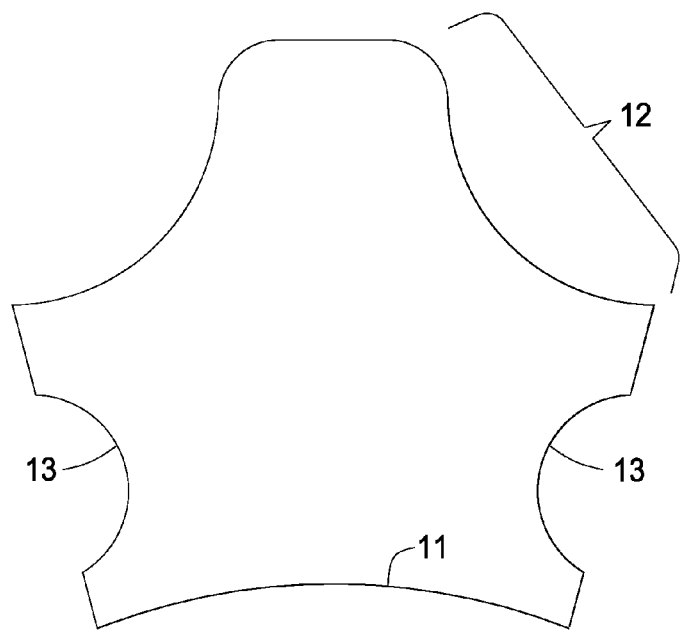
FIG. 2 is a profile of the sprocket tooth section.

FIG. 1 is a perspective view of a sprocket tooth section. A wire 10 preferably stainless steel material is drawn in a wire drawing process, which gives the wire a sprocket section profile, see FIG. 2. Although wire drawing is the preferred process for suitable speed, price, and accuracy, other processes can also be used to manufacture the sprocket section including machining and casting. FIG. 2 is a profile of the sprocket section. If required the sprocket section is subsequently ground continuously in-line with known methods to meet the tolerance requirements of a sprocket tooth.

Figure 3:
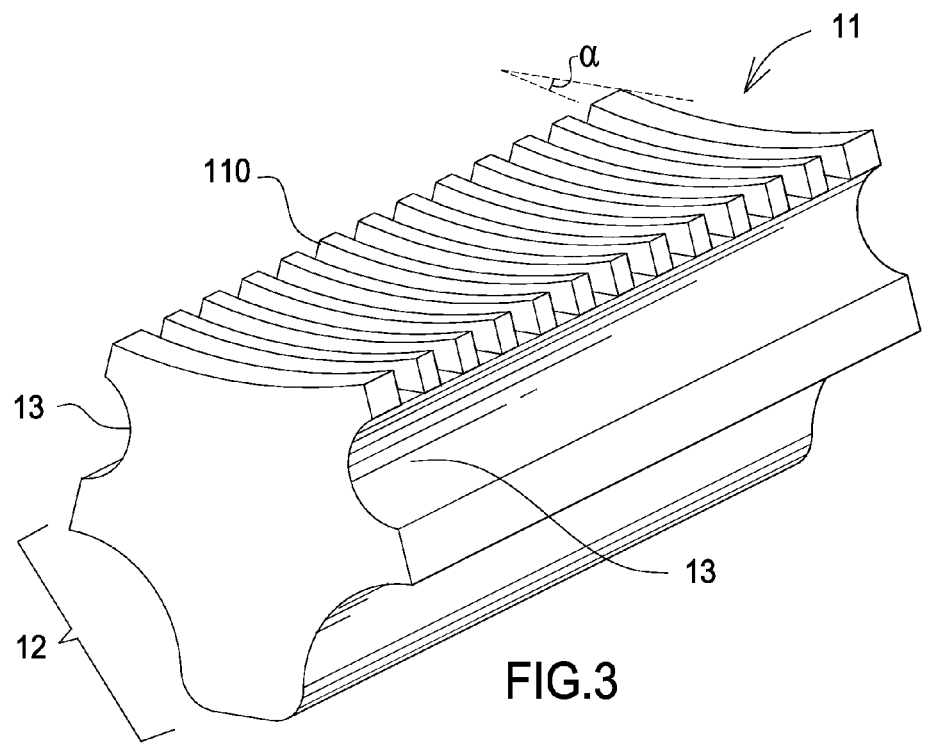
FIG. 3 is a bottom perspective view of the sprocket section.

Section 10 comprises a slightly concave end 11, below the tooth area 12. End 11 is subjected to a cutting or grinding operation in the transverse direction (width) thereby creating grooves 110 that will receive tensile cords. FIG. 3 is a bottom perspective view of the sprocket section. Grooves 110 preferably are disposed at an angle α to allow continuous winding of a tensile cord. Tooth area 12 has a profile suitable for engaging a toothed belt.

Each sprocket section comprises cooperating pockets 13 disposed on each side of section 10. Pockets 13 are used as a retaining mechanism for elastomer portions. The pockets also allow for small amounts of expansion and contraction or side to side flexibility of the finished sprocket.

Sprocket section 10 is then cut to the desired length. The preferred length is typically the length of a mandrel (M). Mandrel M is similar to those used in manufacturing belts.

Figure 4:
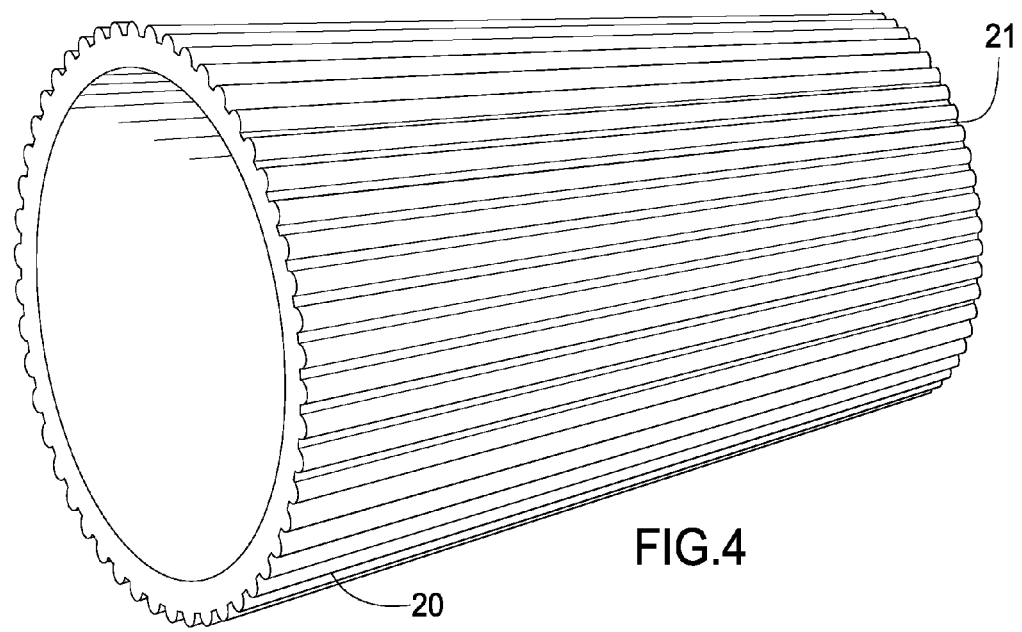
FIG. 4 is a perspective view of a mandrel.

FIG. 4 is a perspective view of a mandrel. The mandrel comprises a plurality of grooves 21 that are disposed about an outer perimeter of the mandrel and extend along the major axis in the longitudinal direction. A sprocket section 10 is received inside a mandrel groove 21 with the tooth portion 12 inserted into a groove 21 and with the end 11 facing radially outward.

Figure 5:
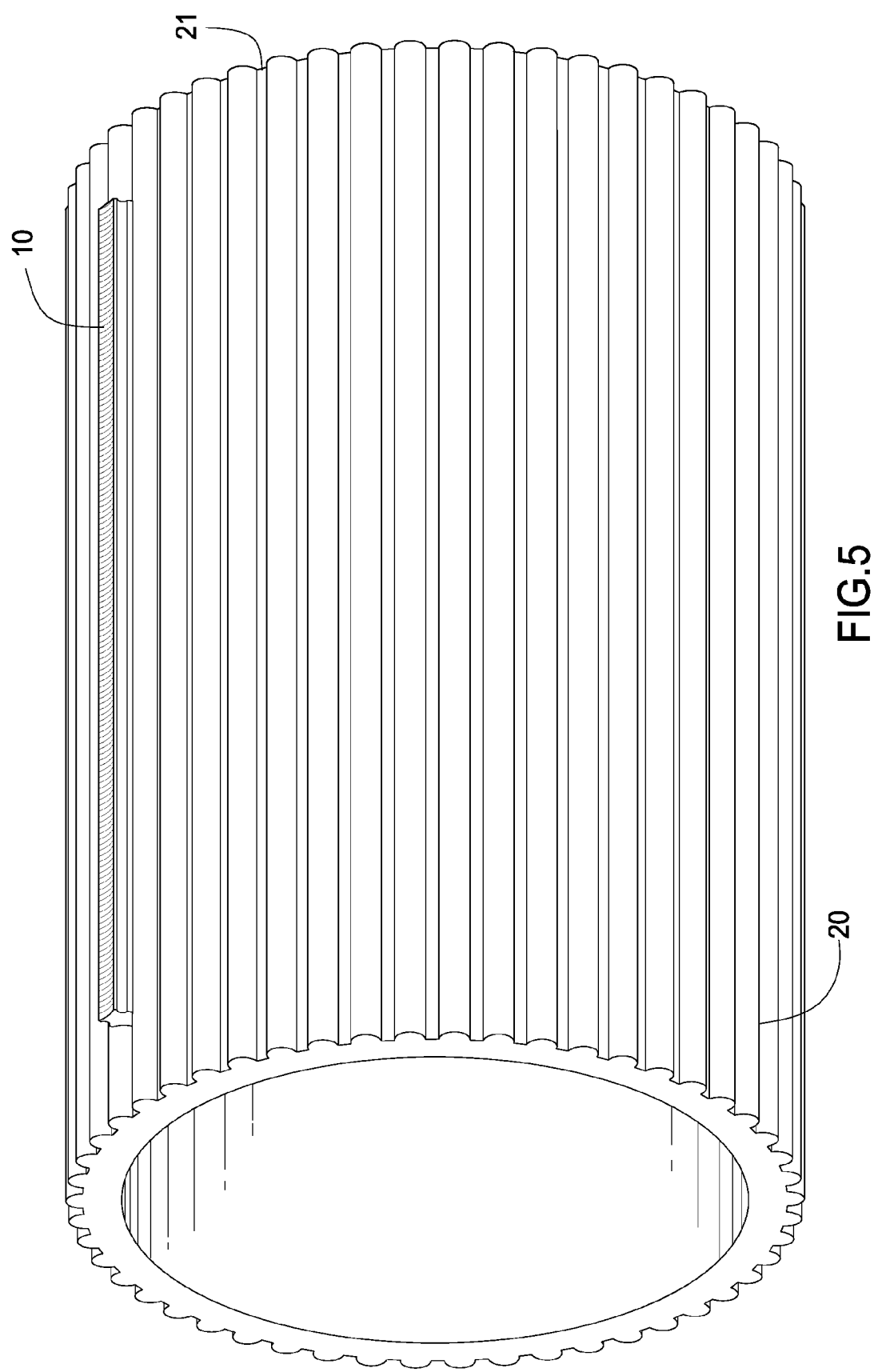
FIG. 5 is a perspective view of the belt mandrel with a sprocket section installed.

FIG. 5 is a perspective view of the belt mandrel with a sprocket section installed. Each sprocket section 10 is temporarily held in place by a template (not shown) until all sections 10 are installed in order to prevent sections 10 from falling out of the grooves 21.

Figure 6:
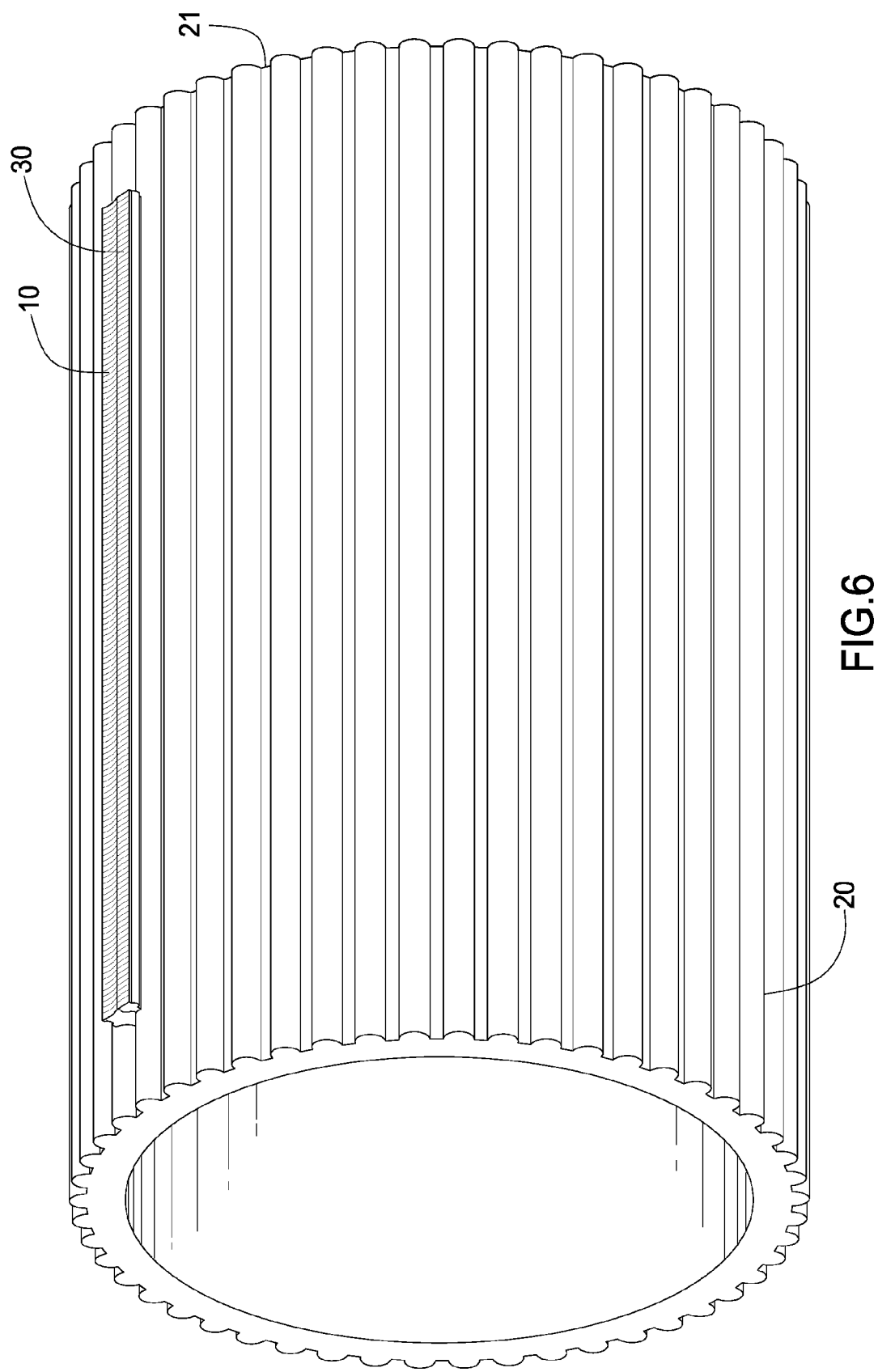
FIG. 6 is a perspective view of the sprocket section with elastomer added.

FIG. 6 is a perspective view of the sprocket section with elastomer added. Strips of elastomer 30 are inserted between sections 10 into adjacent pockets 13.

Figure 7:
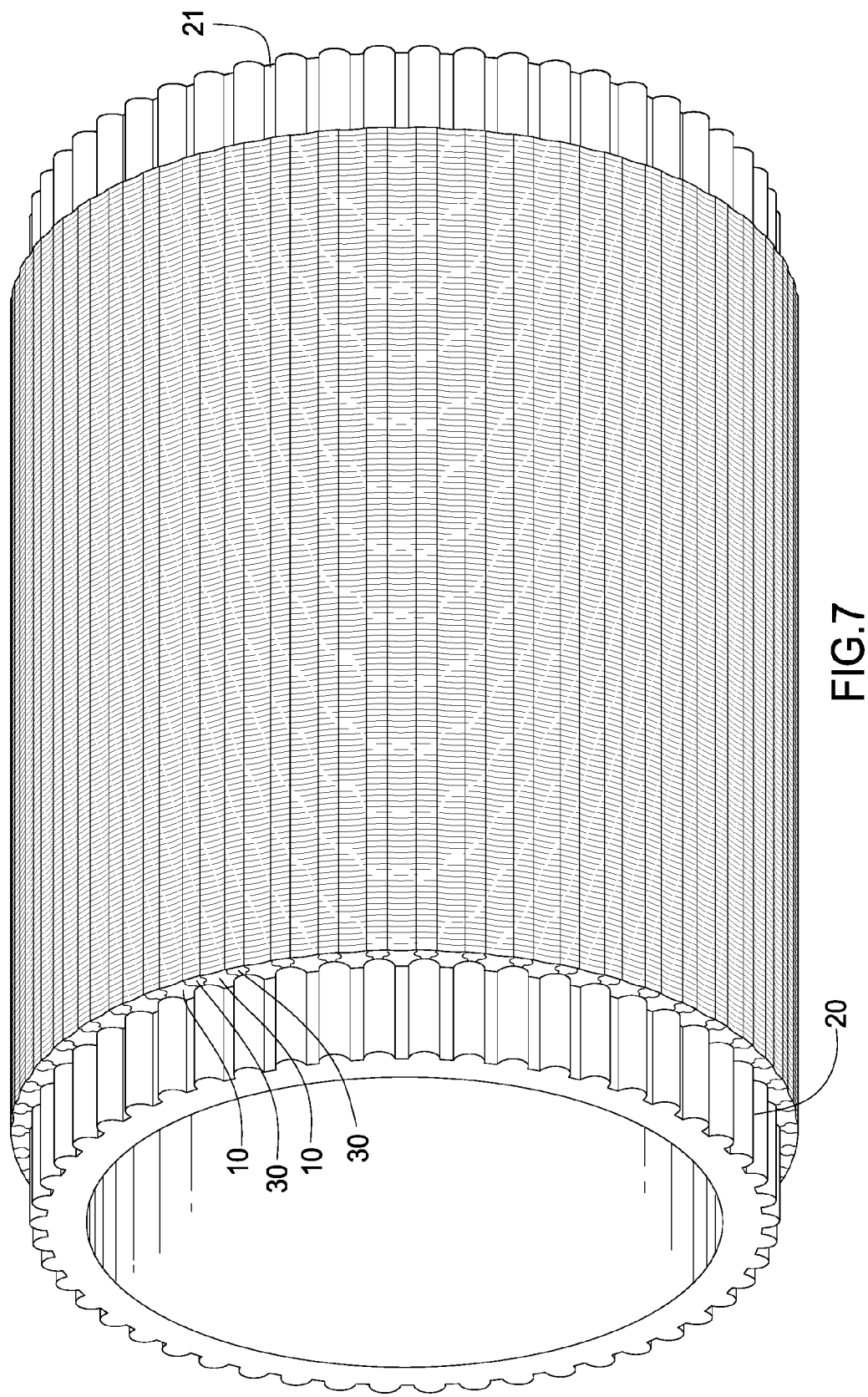
FIG. 7 is a perspective view of the belt mandrel with all sprocket sections installed including elastomer.

FIG. 7 is a perspective view of the belt mandrel with all sprocket sections installed including elastomer. The finished build has an alternating sequence of section 10 and elastomer 30, side by side.

Figure 8:
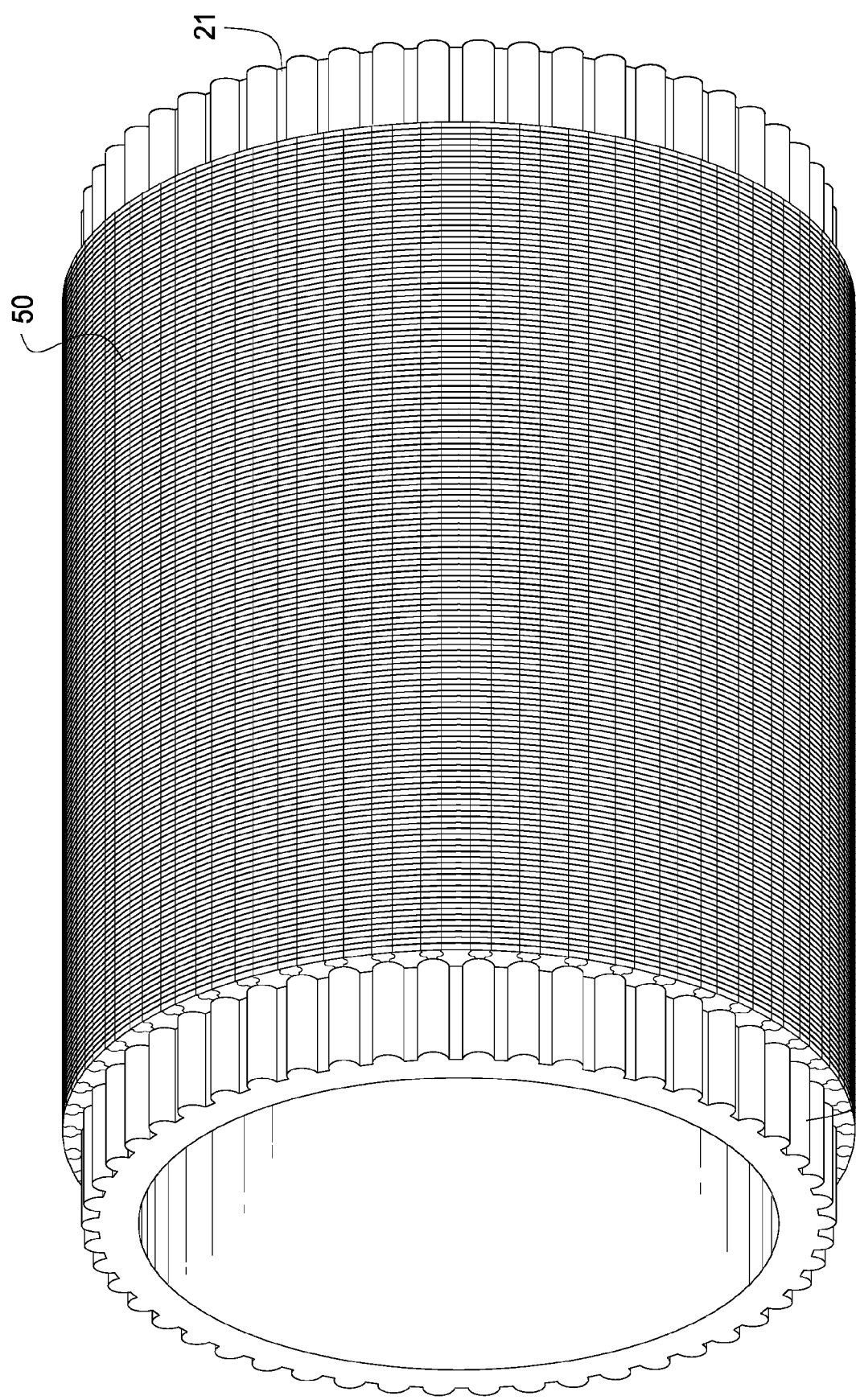
FIG. 8 is a perspective view of the belt mandrel with all sprocket sections installed including elastomer and tensile cords.

FIG. 8 is a perspective view of the belt mandrel with all sprocket sections installed including elastomer and tensile cords. In this step a tensile cord 50 is wrapped around the mandrel. The tensile cord is a single continuous strand and is engaged with the grooves 110.

Elastomeric material 40 is layered over the tensile cords 50. Elastomeric material 40 fills through the spaces created by the adjacent pockets 13 of sections 10. This arrangement also locks the elastomer material 30 in place with the precise accuracy of the mandrel.

As is the case with elastomer-metal combinations, the metal surface has to be treated for elastomer bonding in a manner known in the art, if needed. The tensile cord material also may be coated for bonding in a manner known in the art, if needed.

To assure that the tensile cord 50 does not come in contact with the metal teeth grooves 110, at least one layer of elastomer 40 would be applied before and after winding the tensile cord, so that the cord will be fully covered in elastomer.

If grooves 110 are ground at 90 degrees to a mandrel longitudinal length it is necessary to individually wind a separate tensile cord in each groove 110. Consequently, it is preferable to grind grooves that are slightly angled (a) to the width to allow a continuous winding of a single tensile cord. Each groove should be large enough to allow it to be filled up with elastomer in addition to the tensile cord, thereby allowing the tensile cords to be encased by the elastomer inside each groove 110.

The stiffness of elastomer used for this sprocket can wary from very stiff to softer materials depending on the requirements of the power transmission system and the desired flexibility of the sprocket teeth.

Figure 9:
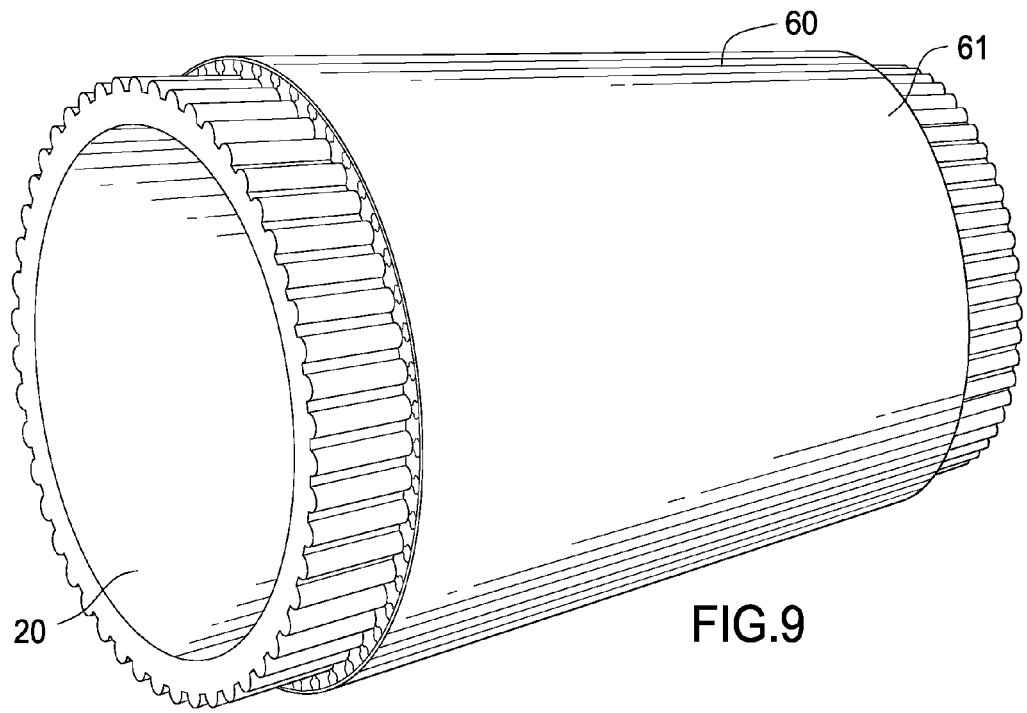
FIG. 9 is a perspective view with an elastomeric layer over the build.

FIG. 9 is a perspective view with an elastomeric layer over the build. A final elastomer layer 60 is then wrapped around the build.

Further, any additional skin material that is desired is wrapped around the layer 60. The outer elastomer layer can also be designed and made from materials of a required thickness in order to enhance damping and isolation of vibrations, if required. If required, a further outer layer 61 on top of the metal teeth, tensile cords, and outer elastomer layer could have any type of fabric skin, or layers of damping or isolating elastomer skins. The resulting sprocket consequently would be a damper-sprocket or isolator-sprocket.

The mandrel is then placed into the curing oven and the elastomer layers cured in a manner known in the art. Once cured the build is removed from the mandrel and allowed to cool.

Figure 10:
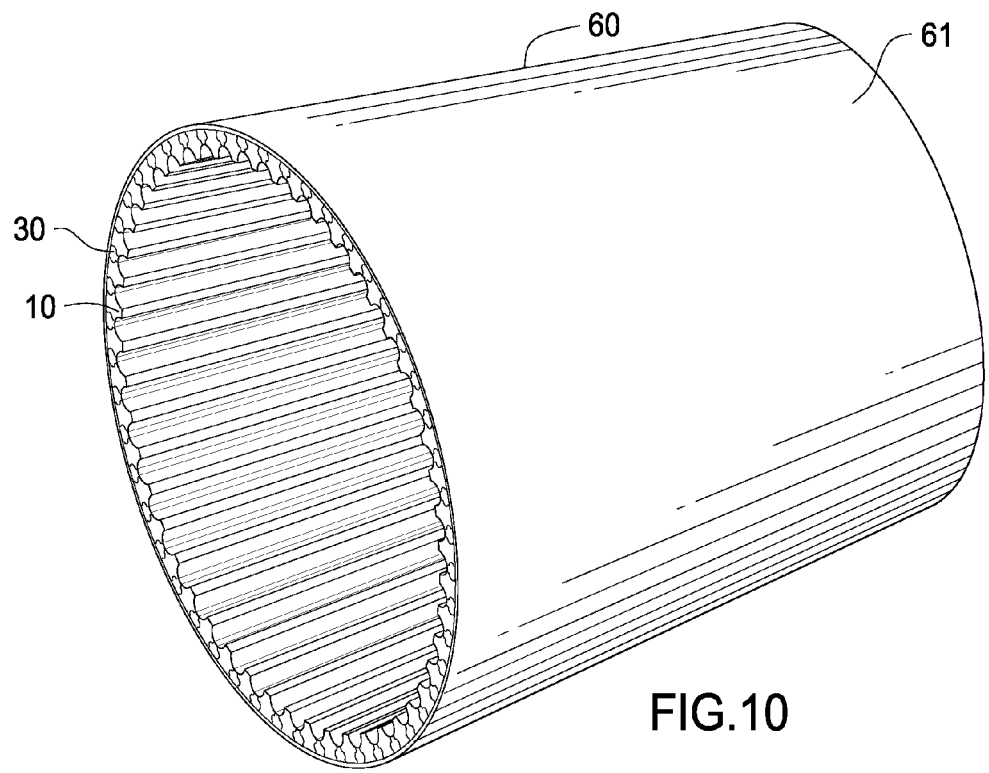
FIG. 10 is a perspective view with the belt mandrel removed.

FIG. 10 is a perspective view with the mandrel removed. The build is cut into at least two or more sprockets of desired widths, see FIG. 12.

Figure 11:
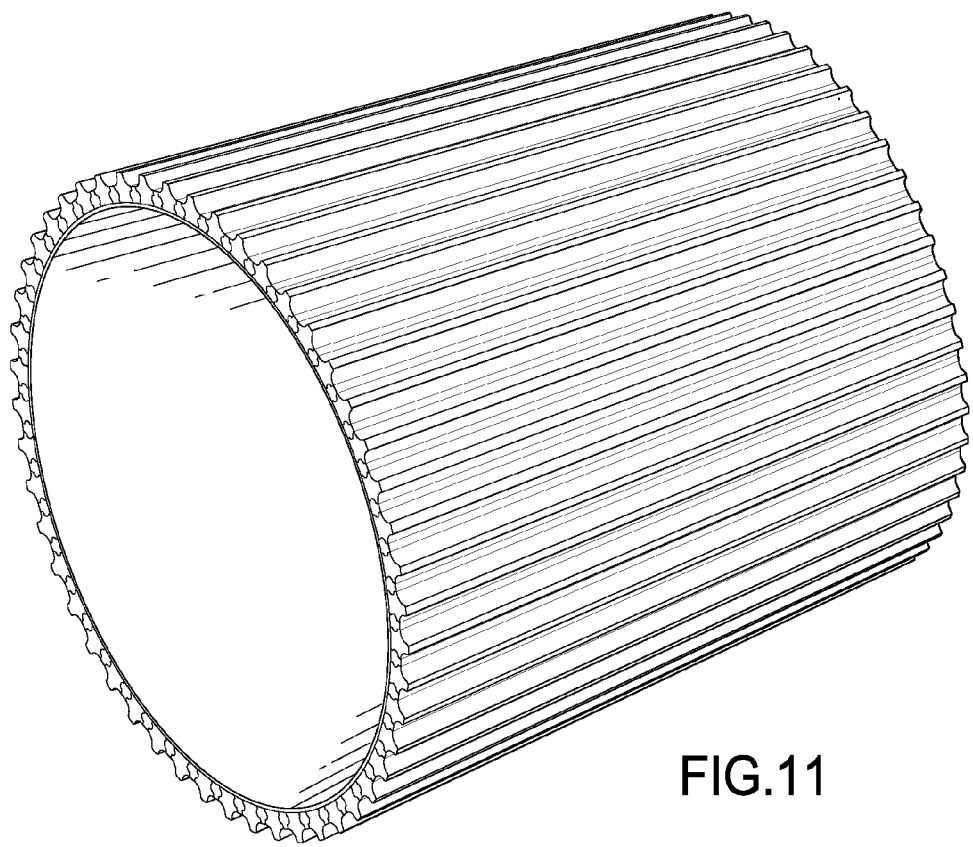
FIG. 11 is a perspective view with the build inverted.

FIG. 11 is a perspective view with the build inverted. In the next step, if the build is not cut in the build position, the sprocket build is flipped inside out, or put another way it is inverted. Inversion is required because the teeth project inwards during assembly of the build. In order to operate as a sprocket the teeth must project outwards, hence it is necessary to invert the build before is it joined to a rigid core.

Due to rigidity of the build in the length direction resulted from the long metal sections, the flipping can only be done if the build diameter is typically more than the longitudinal length. When the build is longer than its diameter, if final product dimensions allow, the build is slit to a final diameter before flipping. Another alternative is to form the product on the inside diameter of a mandrel instead of the outside.

In another alternate embodiment the completed build is cut to a predetermined length so as to create a strip having ends. The cut strip is then wrapped around and fastened to a rigid core as described in FIG. 14.

Figure 12:
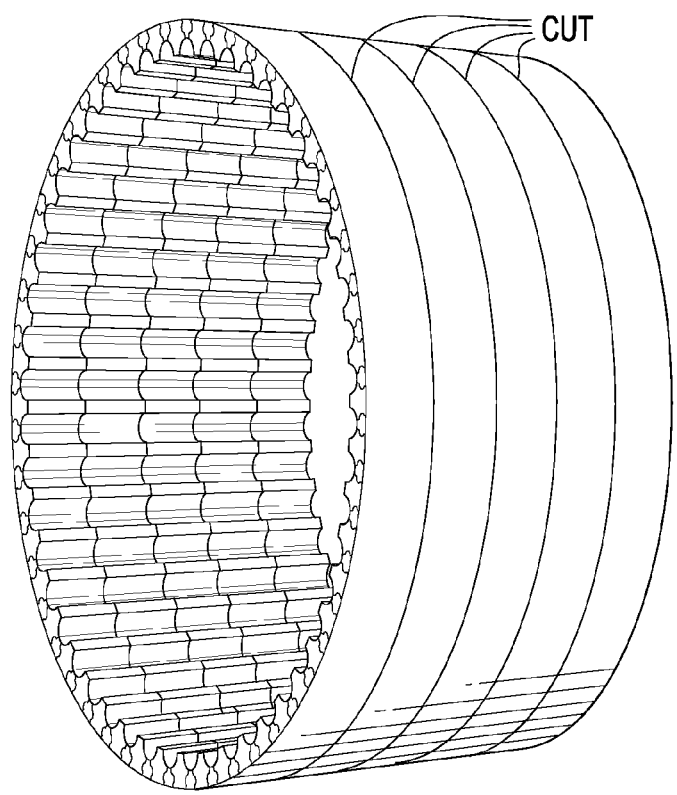
FIG. 12 is a perspective view of the build cut into separate sections.
Figure 13:
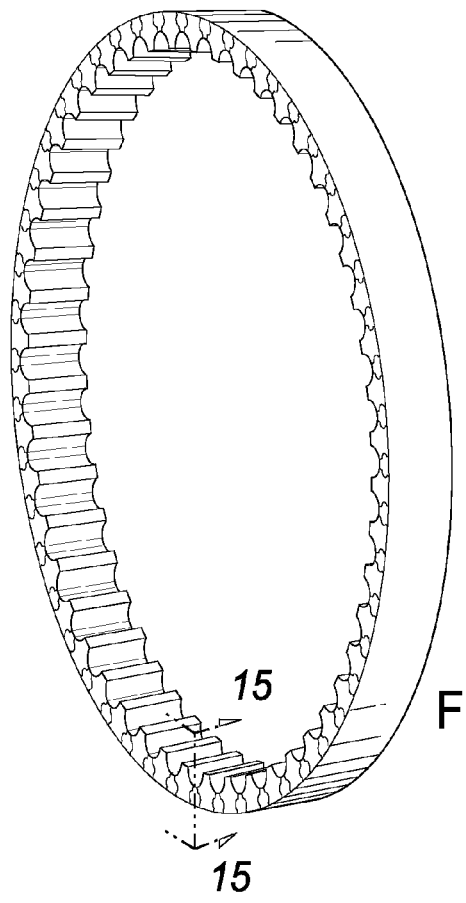
FIG. 13 is a perspective view of the alternate sprocket section.
Figure 15:
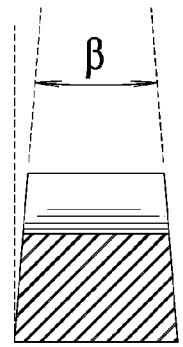
FIG. 15 is a cross section detail from FIG. 13.

FIG. 12 is a perspective view of the build cut into separate sections. In an alternate embodiment the build is not inverted, instead, it is maintained in the orientation it has when removed from the mandrel as shown in FIG. 12. The build is cut into pieces having the desired widths. In an alternate embodiment the sides of the build are ground to an included angle β. This treatment results in a CVT belt. The metal teeth in the build provide excellent compressive rigidity and wear resistance. FIG. 13 is a perspective view of the alternate sprocket section.

Figure 14:
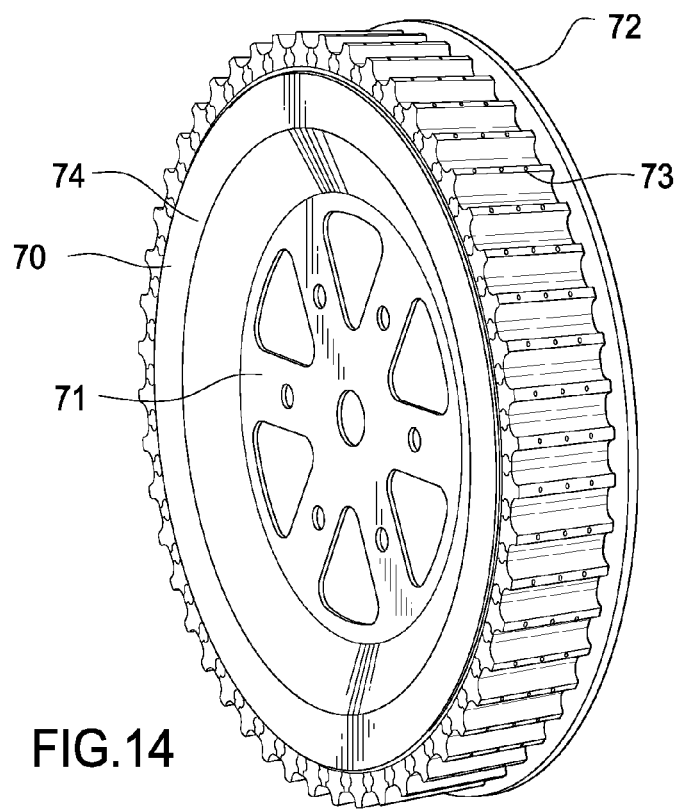
FIG. 14 is a perspective view with the sprocket section installed on a rigid core.

FIG. 14 is a perspective view with the sprocket section installed on a rigid core 70. The rigid core 70 is usually made from stamping or cast ferrous metals, cast aluminum or cast magnesium or any type of plastic. For low wear applications the sprocket core 70 may comprise extruded aluminum. The core 70 may comprise one fixed flange 72 and if desired a second removable flange. The inventive sprocket can be fastened to the center part by adhesives or by mechanical fasteners, or be mechanically retained inside the flange(s).

In an alternate embodiment, especially when no flexibility for the sprocket teeth is desired or required and the teeth are locked in place on the rigid core 70 by fasteners or by adjacent flanges 72. The tensile cord 50 and grooves 110 are not required for this embodiment. This reduces the cost of the sections 10 (no grinding of slots) and eliminates tensile cords, tensile cord treating and the tensile cord winding operation.

In yet another alternate embodiment, as in initial step each sprocket section 10 is cut to size for a given sprocket rigid core 70 width instead of being built in a wide mandrel. Holes 73 are drilled to accommodate fasteners in each sprocket section as well as each flange. No elastomer 30 is used. The sprocket sections 10 are assembled between the flanges 72, 74 using fasteners thereby creating an all metal sprocket with openings between adjacent grooves. The openings create mud ports by which debris can be ejected from the sprocket grooves. The mud ports occupy the location of the elastomer 30 in the above described embodiments, but which is omitted from this embodiment.

In yet another alternate embodiment, the build is not mounted on a rigid core. Further, the build is not inverted, instead it is used in the same orientation as the build process without being inverted. The sides of the build are ground to a predetermined angle β, see FIG. 13. This embodiment can then be used as a CVT belt. Each of the sections 10 contribute excellent lateral rigidity to the belt since in this application each section is compressively loaded along its major axis. This is because in a CVT belt the sides of the belt are loaded in compression.

Although forms of the invention has been described herein, it will be obvious to those skilled in the art that variations may be made in the construction and relation of parts without departing from the spirit and scope of the invention described herein.

We claim:
1. A method of forming a sprocket comprising:
forming a sprocket member having a profile;
forming grooves in a sprocket member base;
installing a plurality of sprocket members in a mandrel thereby forming a build;
inserting an elastomer member between adjacent sprocket members;
wrapping a tensile member about the sprocket members and elastomer members;
curing the build; and
removing the build from the mandrel.

2. The method as in claim 1 further comprising inverting the build and joining the build to a rigid core.

3. The method as in claim 1 comprising applying an elastomeric layer over the build before curing.

4. The method as in claim 1 comprising cutting the build to form at least two sprockets of a predetermined size.

5. The method as in claim 1 comprising joining the build to a rigid core using fasteners.

* * * * *